June 30, 1970  J. R. HANNAHS  3,518,397
APPARATUS FOR ELECTROSLAG WELDING
Filed June 20, 1968  4 Sheets-Sheet 3
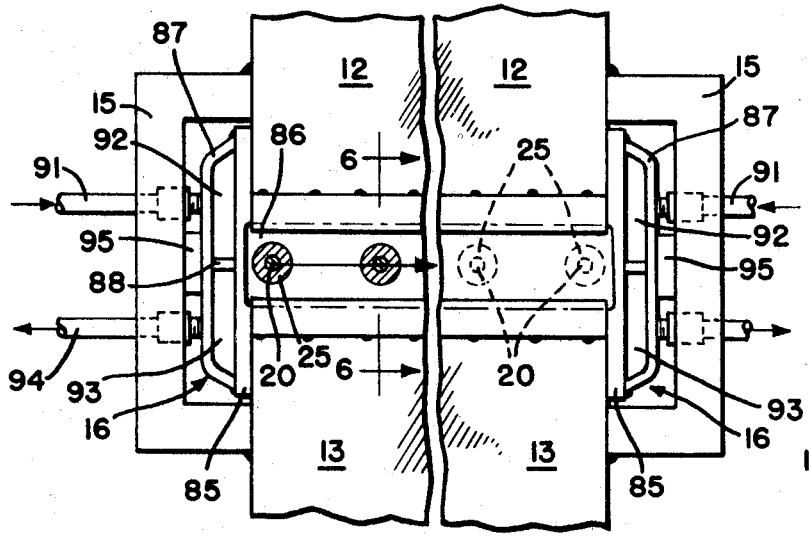
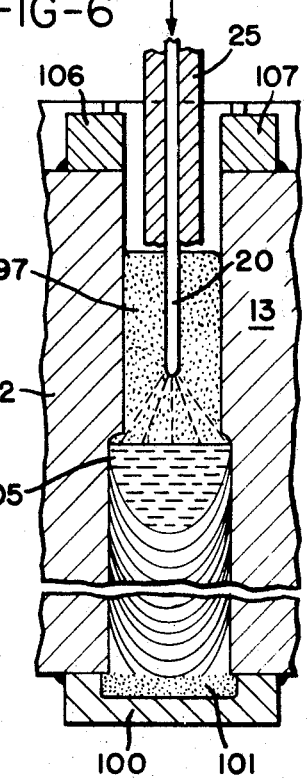
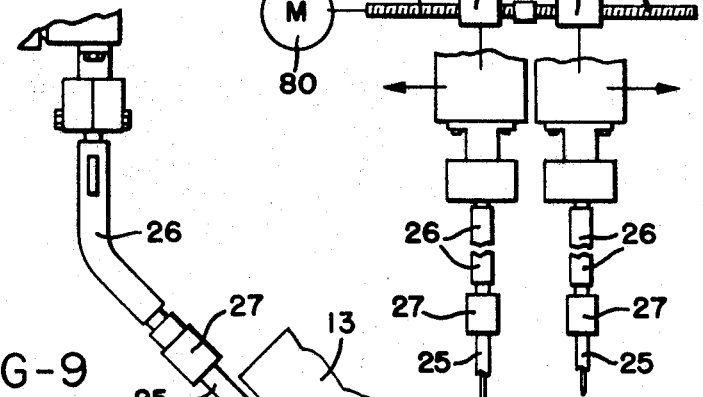
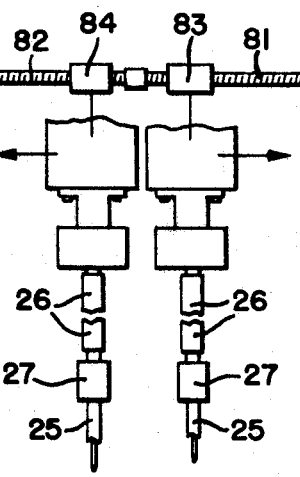
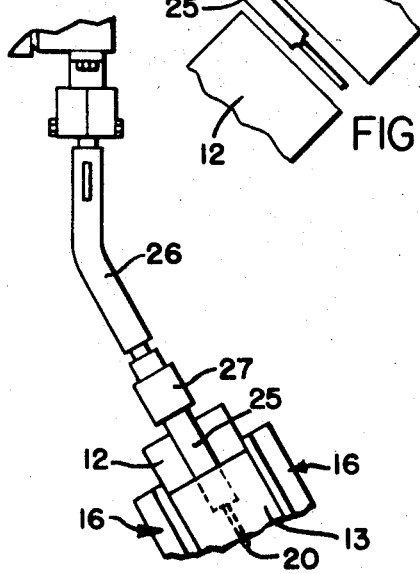
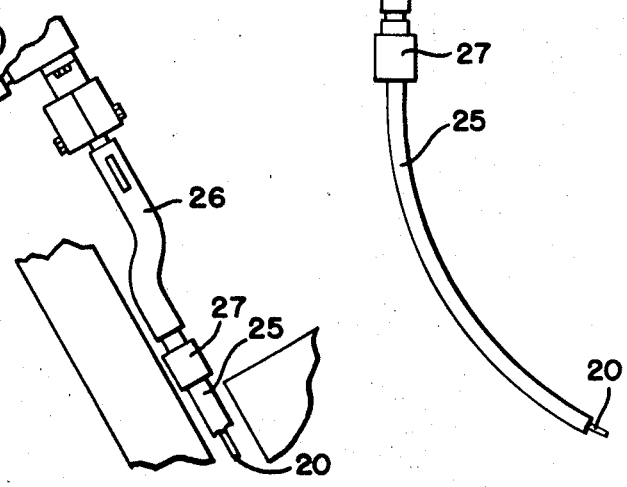
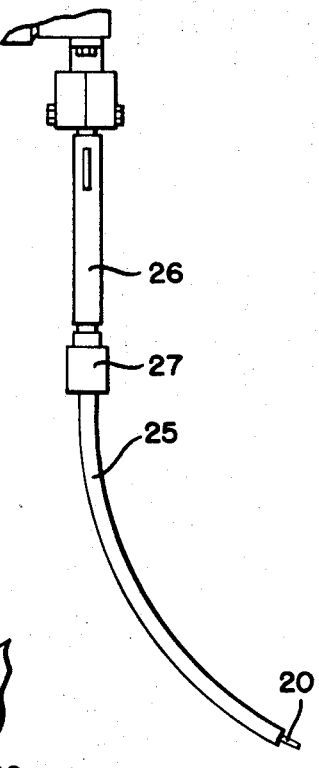

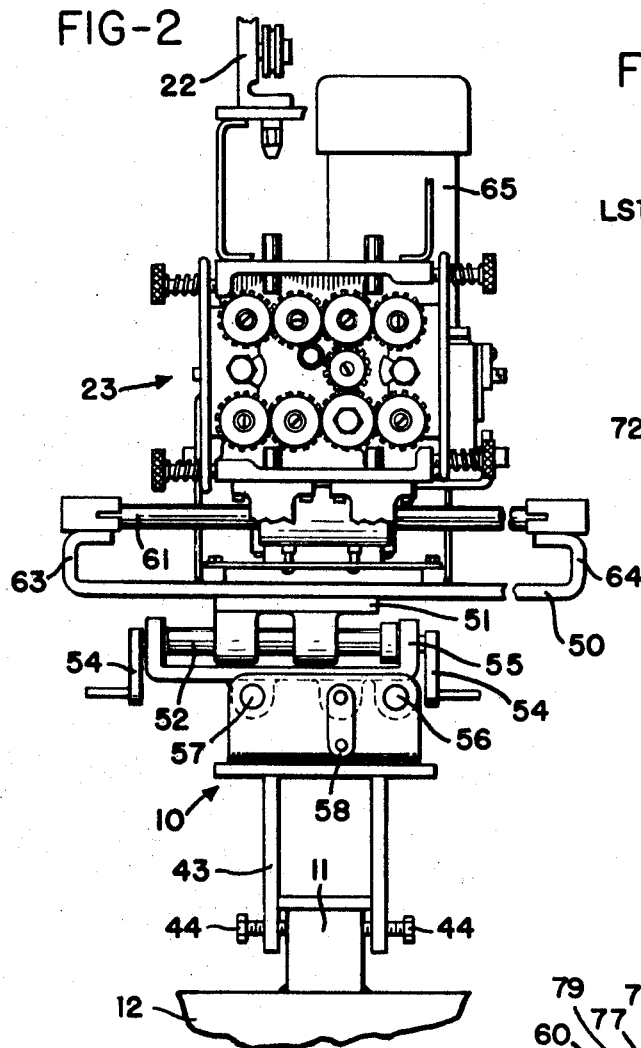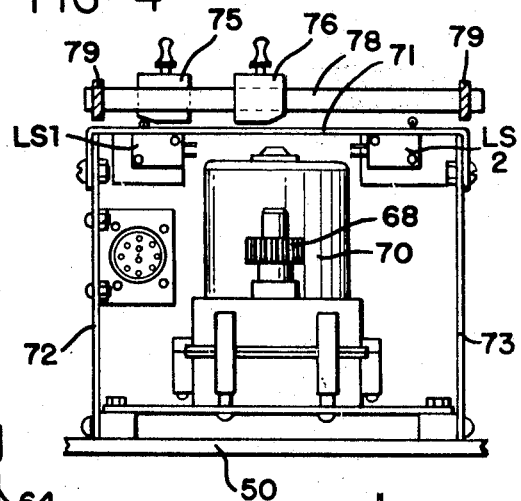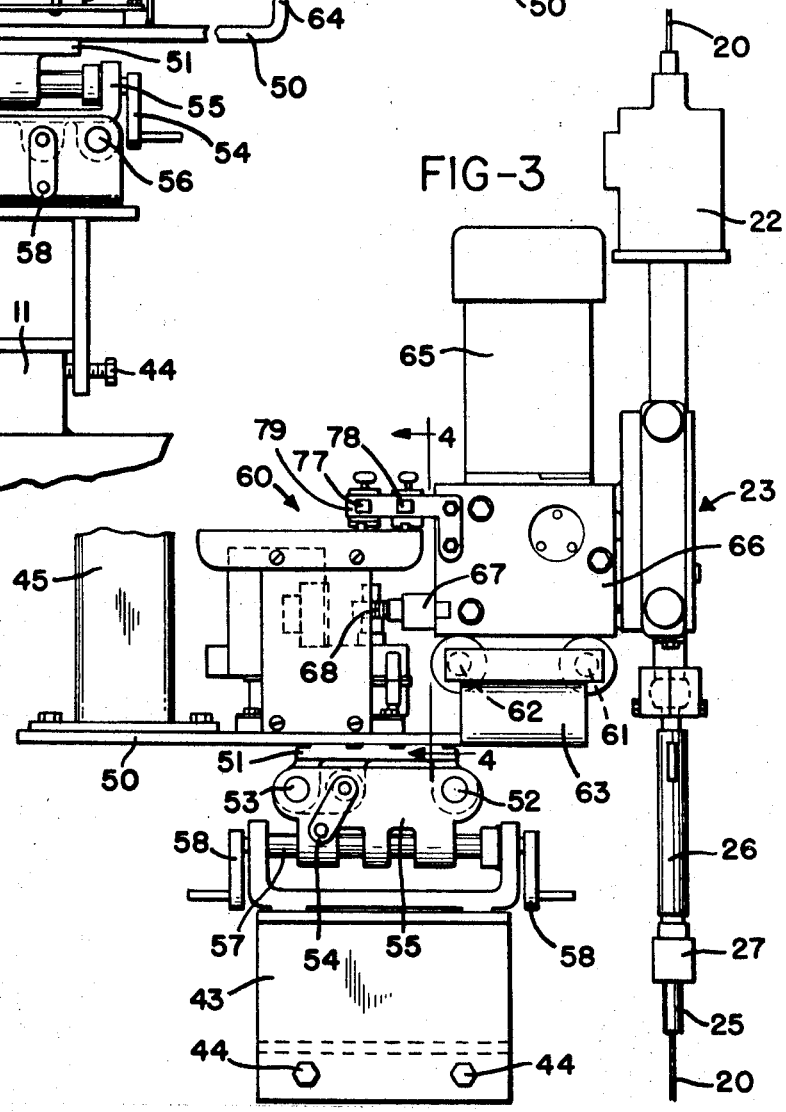

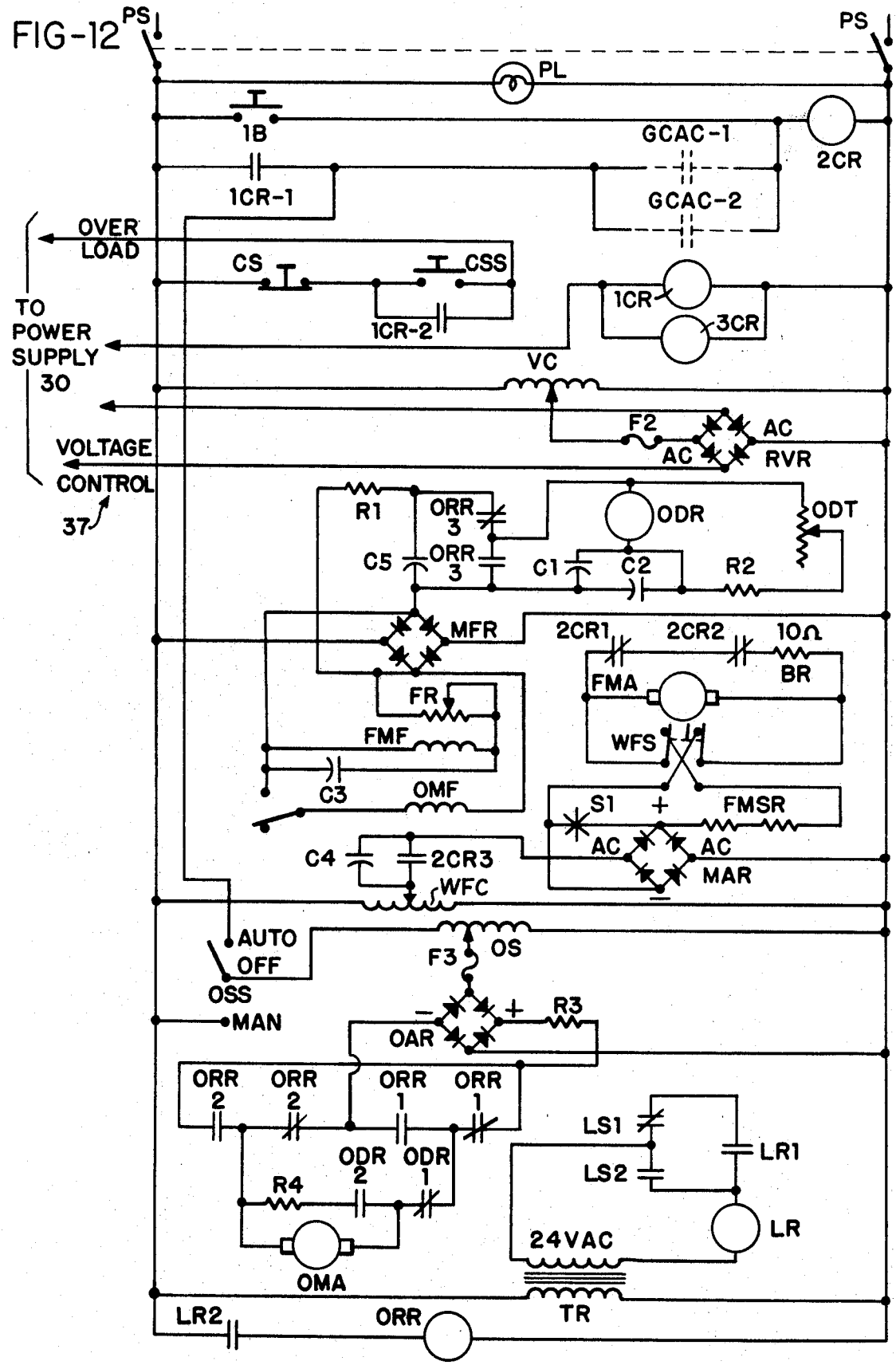

United States Patent Office 3,518,397
Patented June 30, 1970

3,518,397
APPARATUS FOR ELECTROSLAG WELDING
James R. Hannahs, Troy, Ohio, assignor to Hobart Brothers Company, Troy, Ohio, a corporation of Ohio
Filed June 20, 1968, Ser. No. 738,599
Int. Cl. B23k 25/00, 9/18
U.S. Cl. 219—73                                   2 Claims

ABSTRACT OF THE DISCLOSURE

An electroslag welding process and apparatus includes a consumable guide adapted to extend into a space formed between the parts to be welded. This space normally contains flux and slag forming ingredients which become molten and electrically conductive. A wire electrode is fed through the consumable guide and is melted by the flow of current from the electrode through the molten flux to the parts, and as the molten metal rises, the guide is consumed. The consumable guide is oscillated across the thicknes of the weld to insure even heat distribution and to maintain uniform penetration of heat into the parts.

BACKGROUND OF THE INVENTION

Electroslag welding is a process in which an electrode is fed into a space formed between two or more parts to be welded and melts due to heating caused by the flow of electrical current from an electrode into the parts through molten flux. The molten metal from the electrode forms a pool which is shielded by molten slag which is either added from an external source, or which may be supplied as part of the welding wire.

Conventional electroslag welding is usually done with the space between the parts to be welded vertically oriented. Water cooled shoes are placed on each side of the joint to contain the molten metal and the slag. A quantity of granular welding flux and slag forming material is placed between the parts and the electrode is inserted through the flux. An arc is momentarily struck to melt the flux and the electrode, but thereafter the arc is engulfed. Current then passes from the electrode to the parts through the conductive molten slag, and the heat generated by the resistance to the flow of electrical current through the molten slag and weld pool is effective to continue to melt the electrode and to fuse that portion of the parts in the welding area to the metal deposited from the electrode. Therefore, during the acutal welding process, no arc exists.

Since it takes time to develop the molten pool, a starting tab is usually placed below the work to permit molten weld metal to build up before its level rises sufficiently high enough to reach the work. Also, at the top of the weld, a finishing tab is provided to allow the molten pool to extend slightly above the top of the work. Both the starting and finishing tabs are later removed and the weld finished flush with the work.

In one form of prior art electroslag welding apparatus, one or more electrodes are fed into the same joint, the number of electrodes depending upon the thickness of the joint to be welded. For relatively thick joints, these electrodes may be oscillated back and forth across the joint to insure an even distribution of heat and to maintain uniform penetration of weld metal into the work. With this type of apparatus, the assembly holding the electrodes is moved upwardly at the same rate as metal is deposited in the joint.

Water cooled shoes are used on each side of the joint to cool the molten metal and slag pool and to act as a mold to shape the outer surfaces of the weld. These molding shoes are slid up the joint as welding progresses. Thus, considerable equipment is needed to control the rate of movement of the welding shoes and the assembly holding the electrode wire and to correlate this movement with the rate of feed of the electrode into the joint.

Another prior art electroslag welding apparatus uses a consumable guide through which the welding wire passes as it is guided into the joint. Current is supplied to the electrode wire through the guide so that only that portion of the wire which extends out from the guide can carry electrical current and therefore is heated to cause melting thereof. Of course, any portion of the guide in contact with the conductive molten flux pool may also supply current to the pool. The consumable guide melts as the pool rises and also acts as filler metal for the weld. Since the guide melts automatically with the molten slag, the apparatus performing this process is relatively simple and portable. In its simplest form, the apparatus includes only a mechanism to feed the welding wire electrode, and power cables to carry the current to the consumable guide and one of the parts. Normally, this apparatus is mounted directly on the work and remains in a fixed position throughout the welding process.

As the thickness of the part to be welded becomes larger, normally above two inches, not enough heat is generated to fuse the weld completely, and therefore additional consumable guides are introduced into the weld joint. However, the large number of guides required for thick welds is cumbersome and in some cases leads to poor heat distribution and a poor solidification pattern, and therefore cracking within the joint might occur. Also, care must be taken to insure that all electrodes are actually started, otherwise the joint will not be properly welded.

Thus, in the known methods of electroslag welding relatively thick parts, either the electrode assembly must be oscillated and moved upwardly at the same rate as metal is deposited, or a plurality of consumable guides must be placed within the joint in order to provide for proper metal and heat distribution. With the first system, the equipment to perform this job is expensive, while with the second system, even heat dstribution is not always obtained and cracking of the joint may occur.

SUMMARY OF THE INVENTION

This invention relates to an electroslag welding method and apparatus wherein an electrode is directed into the space between the parts being welded by a consumable guide which is made to oscillate across the joint to distribute the heat generated during the welding operation and to obtain complete fusion between the parts being welded and the welding material.

One or more consumable guides may be placed in the space, depending upon the thickness of the parts to be joined together. These consumable guides may be formed from tubes made of mild steel, or a suitable alloy, or they may be formed from a plurality of rods bonded together with a generally centrally located opening through which a wire electrode may pass and which will carry electric current to that part of the electrode which extends outwardly from the guide. The consumable guides are oscillated across the thickness of the parts, either with a linear motion and with specified dwell times at the end of each stroke, or with a sinusoidal motion. Also, when using more than one guide, the guides may be moved toward and away from each other in order to distribute evenly the heat and weld material.

The method and apparatus of this invention therefore combines the advantages of the prior art electroslag welding devices while eliminating their disadvantages. For example, the appparatus constructed according to this invention may be mounted atop one of the parts to be joined, and the consumable guides mounted so that they extend to the bottom of the weld joint. Thus, as the weld rises, the guides will be consumed automatically. By oscillating the consumable guides, heat and weld metal are evenly distributed across the joint. Thus fewer consumable guides are required to weld plates of substantial thickness than with the prior art method.

It is therefore the principal object of this invention to provide a method and apparatus for electroslag welding wherein at least one consumable guide is oscillated within the space between the parts being welded to distribute the weld material and the heat generated during the welding operation; to provide an improved electroslag welding method and apparatus wherein a cored wire electrode may be supplied to the joint through the consumable guide, the cored wire containing the necessary fluxing and slag forming ingredients to maintain an insulating covering over the weld throughout the duration of the welding operation; and to provide an electroslag welding method and apparatus wherein at least one consumable guide is slidably supported on a frame which may be mounted adjacent one of the parts being welded, wherein the guide is moved between adjustable limit switches which define the length of stroke taken by the guide, and wherein the dwell time at each end of the stroke is controlled to provide optimum heat distribution.

Other objects and advantages of the invention will be apparent from the following description, the accompanying drawings and the appended claims.

BRIEF DESCRIPTION OF THE DRAWINGS

FIG. 2 is a front elevational view showing a wire feeder mechanism and a frame supporting the consumable guides for oscillation across the thickness of the joint;

FIG. 3 is a side view of the welding apparatus showing the supporting frame and a motor for oscillating the consumable guides;

FIG. 4 is a view taken along line 4—4 in FIG. 3 showing the drive motor and adjustable stops which cooperate with limit switches to control the distance through which the oscillating guides travel across the weld;

FIG. 5 is a plan view showing water cooled shoes mounted on each side of the weld joint to contain the molten slag and metal, and also showing, in cross section, the oscillating consumable guides and their path of motion;

FIG. 6 is a cross sectional view taken along line 6—6 in FIG. 5 showing an electrode extending through a consumable guide into the molten slag and weld metal formed between the two plates being joined;

FIG. 7 is an elevational view showing an alternative arrangement for oscillating the consumable guides so that they move in opposite directions across the weld;

FIGS. 8, 9, 10 and 11 show alternative arrangements of the means mounting the consumable guide for welding plates having a joint which is oriented other than vertically;

FIG. 12 is an electrical schematic diagram of a circuit for controlling the rate of motion of the consumable guides and the dwell times of the guides at each end of their stroke.

DESCRIPTION OF THE PREFERRED EMBODIMENT

Figure 1:
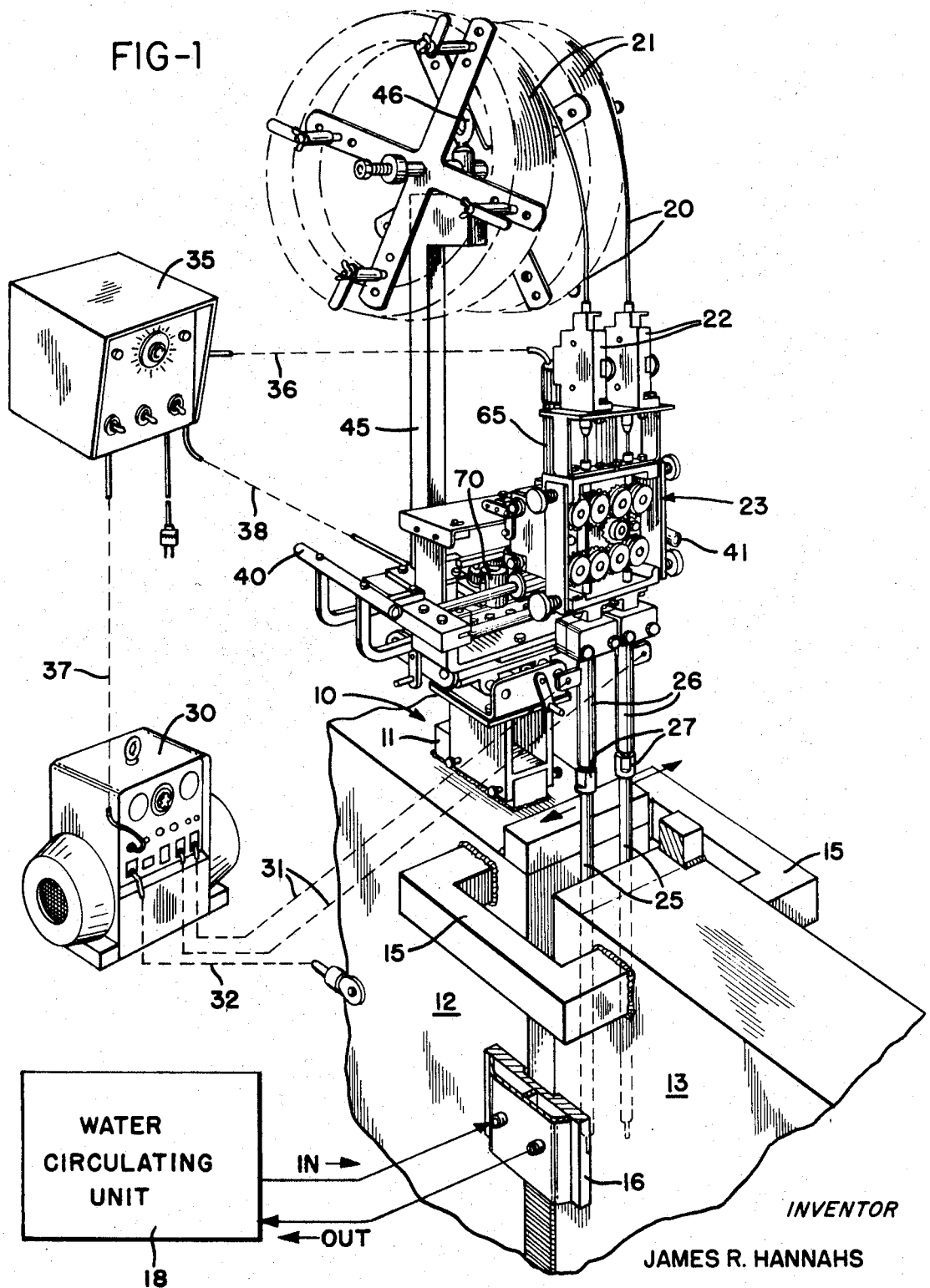
FIG. 1 is a perspective view of a welding apparatus constructed according to this invention, showing two consumable guides mounted for oscillation across the thickness of the parts and extending into a space formed between the two parts to be welded.

Reference is now made to FIG. 1 which shows a preferred embodiment of an electroslag welding apparatus constructed according to this invention. The apparatus includes a frame, shown generally at 10, which is secured to block 11 temporarily welded to one of the parts to be welded. In FIG. 1, parts 12 and 13 are to be butt welded, however, other types of welding, such as T and corner welds, may also be accomplished with the same apparatus.

The plates 12 and 13 are held in place by a plurality of U-shaped brackets 15 which are temporarily welded to the plates 12 and 13 to fix them in position relative to each other. After the plates have been welded together, the brackets 15 will be removed. In FIG. 1, only two such brackets 15 are shown, but it is to be understood that usually several of these brackets will be welded temporarily to the plates in the manner shown. These brackets also serve to hold a water cooled molding shoe 16, as will be described in more detail later. Cooling water is circulated through the shoes 16 from a water circulating unit 18 to prevent the shoes from being fused to either the plates 12 and 13 or the molten weld material which will join these plates.

The wire electrode 20 is supplied into the space between the parts from a pair of reels 21, through wire straightening mechanisms 22, and a wire feeding mechanism 23 to the interior of consumable guides 25. The guides 25 are releasably mounted on extensions 26 of the wire feeding mechanism by chucks 27 and, as shown in FIG. 1, are centrally positioned between and extend vertically downwardly into the space between the plates 12 and 13. As will be described, the consumable guides 25 may be made to oscillate across the thickness of the parts to distribute the heat and the welding material.

Welding current is supplied from a conventional power supply 30 through cables 31 to lugs on extensions 26 which hold the consumable guides 25, through the guides to the electrodes in the immediate vicinity of the weld, and then the flow of current returns through one of the plates to the power supply through cable 32.

The rate at which the wire electrode 20 is fed into the weld is controlled by the control apparatus 35 which has a connection to the wire feeding mechanism 23 by a cable 36. The control apparatus 35 is also provided with means to adjust the welding voltage remotely through cable 37, and to regulate, through cable 38, the velocity at which the consumable guides 25 move across the thickness of the parts. The welding current is determined by the setting of the wire feed speed control.

The frame 10 is provided with a pair of carrying handles 40 and 41 so that the apparatus may be placed on top of one of the plates to be welded. As mentioned above, the block 11 is temporarily welded to the top of one of the plates, and the frame 10, which includes a downwardly extending U-shaped bracket 43 (see also FIG. 2) is placed over the block 11 and held in place by tightening several set screws 44.

The reels of wire electrode 21 are mounted on an upwardly extending post 45. A lifting hook 46 is provided so that the entire assembly, including the frame 10 and the reels 21, may be mechanically hoisted and positioned on the plate 12. Post 45 is provided with a hole on its upper surface which receives an extension from the reels to hold them in place. Normally, the reels 21 weigh approximately 60 pounds each, and can be lifted in place by the machine operator. However, if more than 60 pounds of wire is required to complete the weld in a single operation, then larger reels would be provided. These reels may be located remotely on a separate stand capable of supporting as much as 750 pounds of wire to allow any size of weld to be made without stopping since it has been found that an electroslag weld cannot be stopped and restarted satisfactorily.

Reference is now made to FIGS. 2, 3 and 4 which show the various components which make up the frame 10. The frame includes platform 50 which had depending therefrom a bracket 51 to slidably mount the platform on a pair of shafts 52 and 53. The position of the bracket 51, and thus the platform 50, with respect to the shafts 52 is determined by a screw (not shown) which extends parallel to the shafts 52 and 53, and which may be turned by a crank 54. The bracket 51 also has a member, not shown, which threadedly engages the screw so that the platform 50 may be centrally positioned relative to a thickness of the parts regardless of the location at which the block 11 is temporarily welded.

The shafts 52 and 53 are mounted in a bracket 55 which is slidably supported on a pair of shafts 56 and 57. Bracket 55 may be moved by turning a crank 58 which rotates a screw, not shown, threadedly engaging a portion of the bracket 55. Thus, by turning the crank 58, the consumable guides 25 may be positioned centrally between the plates 12 and 13.

The platform 50 includes means 60 for repeatedly moving the consumable guides across the thickness of the parts being welded at a predetermined velocity. As mentioned above, this is for the purpose of distributing heat and the molten welding material. The means 60 includes a pair of shafts 61 and 62 mounted above the platform 50 by the upstanding members 63 and 64 which, in the embodiment shown, are integrally formed on the platform 50. The wire feed mechanism 23 includes a motor 65 which supplies power to the wire feeder through a transmission 66. The wire feeder mechanism 23 is of conventional design, and therefore the details of this device are not included here, however, the wire feeder mechanism, shown in FIG. 3, supports the consumable guides 25 and forces the wire electrode 20 through the consumable guide into the welding area.

The wire feeder transmission 66 is slidably mounted on the shafts 61 and 62 so that it may move the consumable guides 25 across the thickness of the weld. This is accomplished by securing a rack 67 to the transmission 66. This rack is driven by a pinion 68 which derives its power from a motor 70 mounted on the platform 50. As will be explained, the speed of the motor 70 may be adjusted to control the velocity of the consumable guides 25 as they travel across the thickness of the parts.

The stroke, or the distance through which the consumable guides 25 oscillated, is controlled electrically by limit switches LS1 and LS2. These limit switches are mounted in a housing which includes a horizontal plate 71 supported by two brackets 72 and 73 which extend vertically upwardly from the platform 50.

The wire feeder mechanism 23 carries with it a pair of adjustable stops 75 and 76 which actuate the limit switches LS1 and LS2, respectively. The stops 75 and 76 are adjustably mounted by thumb screws on arms 77 and 78, and these arms are in turn mounted to the transmission 66 by brackets 79. As shown in FIG. 4, the adjustable stops 75 and 76 have a tapered surface which engages that portion of the actuating arm of limit switches LS1 and LS2 which extend above the plates 71. Thus, as the consumable guides 25 are driven across the thickness of the parts by motor 70, the stops 75 and 76 will eventually engage the actuating arm of their corresponding limit switch, and this will cause the motor to reverse direction after a specified dwell period to move the guides in the opposite direction across the thickness of the parts.

Other types of means may be employed to oscillate the consumable guides across the thickness of the weld, one alternative being shown in FIG. 7 where the guides are driven by a motor 80 through a shaft having a right hand thread 81 and a left hand thread 82. Thus, as the motor 80 rotates in a clockwise direction, the consumable guides 25, which are operably coupled to the shafts through threaded members 83 and 84, will move away from each other across the thickness of the weld, and rotating the motor in the counterclockwise direction will cause the guides to move toward each other. Of course, the guides may be separately driven, and could be moved at different rates across the joint.

Another alternative embodiment would be to use a crank arm on a continuously running motor to oscillate the consumable guides. This provides a sinusoidal motion to the guides, and practically eliminates the need for a dwell time at each end of the stroke since the guides are moving relatively slowly near these position. The length of the stroke is of course determined by the radius of the crank arm. A third embodiment would include means to rotate a consumable guide in the space between the plates. However, the embodiment shown in FIGS. 1 through 4 is preferred since it provides more flexibility in setting up and operating the oscillating electroslag apparatus.

Reference is now made to FIG. 5 which is a plan view showing the water cooled molding shoes 16 in cross section and mounted in place adjacent the joint. In the preferred embodiment, these shoes 16 are formed from a copper plate 85 which has a centrally located relief 86 positioned to coincide with the joint between the plates 12 and 13. The relief 86 is to permit slag to solidify adjacent the plate 85 and still be outside a line joining the outer edges of the plates 12 and 13. This slag is later removed since it does not form an essential part of the weld. Therefore, without this relief 86, the weld would have a concave portion when the slag is removed.

The shoes 16 have an outer casing 87 and a barrier 88 which extends vertically substantially the entire length of the shoes. Thus, as water from the circulating unit 18 flows through pipe 91 into the chamber 92 formed by the plate 85, the outer casing 87, the barrier 88, it flows upwardly then across into the chamber 93, downwardly and out the outlet to 94. Therefore, the cooling water is in direct contact with the plate 85 and prevents this plate from being fused to either the plates 12 and 13 or the molten weld material in the joint between these plates.

In the embodiment shown herein, the shoes 16 are held in place by wedges 95 which are driven between the outer casing 87 and the brackets 15 which are temporarily secured to the plates 12 and 13 by welding. Typically, a plurarity of water cooled shoes 16 having a length of approximately 18 inches are used on each side of the weld, with one shoe being placed on top of the other as the weld progresses upwardly. This allows the shoes to be of manageable length while permitting the weld to progress uninterrupted.

In FIG. 5, the consumable guides 25, shown in cross section, may move from the position shown in full lines to the position shown in dotted lines. The number of consumable guides 25 used will depend upon the thickness of the parts being welded together. It has been found that for plates five inches thick, a single consumable guide is all that is required, providing this guide is oscillated across the weld in the manner described. Without oscillating the guide, the maximum thickness which may be successfully welded is in the order of two and one half inches. When welding plates from five to twelve inches in thickness, two consumable guides are normally used, and these guides are placed on three and one quarter inch centers. Of course, this invention is not limited to either one or two guides, but may utilize as many guides as necessary to distrbute the weld material across the thickness of the plates being welded together.

Referring to FIG. 6, the consumable guide 25 is placed in the space between the plates 12 and 13. Normally, these plates are spaced sufficiently far enough apart to accommodate the consumable guide while being close enough together to conserve the heat which will be necessary to melt the wire electrode 20, the flux 97, the lower portion of guide 25, and a portion of each plate. In a typical setup, these plates are spaced 1 and ¼ inch apart.

To start the welding operation, a starting dam 100 is temporarily welded across the bottom of the joint and between the plates 12 and 13. This dam includes a recess 101 to accommodate the flux which is added at the start of the weld. This dam 100 and the flux will later be removed when the weld is completed. The electrode wire 20 extends through the consumable guide 25, and an arc is struck between the electrode wire 20 and the dam 100 to generate heat. A quantity of fluxing and slag forming material 97 is placed in the joint by the operator, and as heat is generated, this material melts. The electrode then becomes immersed in this molten slag material, which is also conductive, and the arc will eventually be extinguished. Thereafter, heat is generated by the resistance of the flux.

As heat is generated, a portion of each plate 12 and 13 is melted, as shown at 105 in FIG. 6, and as the weld rises, the molten metal solidifies to form a bond between the plates 12 and 13. Additional slag forming materials must be provided since the slag will form in the cavity 101, and in the cavities 86 adjacent the water cooled shoes 16 as the weld moves upwardly. This slag can be provided either from a separate source, or it can be included as part of the electrode composition or as a part of the consumable guide. Normally, 8 to 9% of the wire electrode 20 could be formed of fluxing material to compensate for the loss due to solidification of the fluxing material in the vicinity of the shoes.

A typical flux composition is given as follows:

|  | Percent |  | Percent |
|---|---|---|---|
| $SiO_2$ | 35 | $CaF_2$ | 6 |
| MnO | 40 | FeO | 3 |
| $Al_2O_3$ | 5 | $TiO_2$ | 3 |
| CaO | 7 | $Na_2O$ | 1 |

As the weld rises, the consumable guide 25 is melted at the same rate. Thus, no mechanical vertical movement of this guide is necessary. However, horizontal movement across the thickness of the weld is required in some cases so that the heat is evenly distributed, and this movement is provided by the apparatus thus described.

At the top of each plate 12 and 13 are run off blocks 106 and 107 which are temporarily welded in place. These blocks permit the weld material to solidify properly at the top surface of the plates. The blocks 106 and 107 are later removed, and the weld is ground flush with the top surface of the plates.

The table below illustrates the rate at which the weld progresses for various thicknesses of plates. For plates up to and including two inches, a single fixed electrode may be used, while plates up to approximately five inches require the use of a single oscillating electrode. Beyond five inches, a pair of oscillating electrodes are used.

ELECTROSLAG WELDING VERTICAL TRAVEL SPEEDS
[Square butt joints with 3/32 inch wire electrodes]

| Plate thickness (in.) | Electrodes | Electrode feed speed, in./min. | Amps. | Volts | Vertical rise, in./min. | Vertical rise in./hr |
|---|---|---|---|---|---|---|
| 1 | 1 | 157 | 600 | 37 | .960 | 57.6 |
| 2 | 1 | 308 | 725 | 37 | .792 | 47.5 |
| 2⅜ | 1 | 276 | 700 | 39 | .569 | 34.1 |
| 3 | 1 | 315 | 750 | 37.5 | .525 | 31.5 |
| 6 | 2 | 237 | 1,160 | 40 | .473 | 28.4 |
| 8 | 2 | 250 | 1,300 | 47 | .385 | 23.1 |

FIGS. 8, 9, 10 and 11 show alternative ways to mount the consumable guides 25. In FIGS. 8 and 9, the feeder mechanism is vertically oriented, and the coupling between the consumable guide and the feeder is bent. In FIG. 8, the plates themselves are vertical and form a joint having an angle of 45°. In FIG. 9, the plates are oriented at an acute angle with respect to the vertical. In FIG. 10 the coupling between the guide and the wire feeder has a S bend to allow the guide to be placed within the joint while the feeder mechanism clears an obstacle. In FIG. 11, the consumable guide itself forms a curve which extends into the space between a pair of plates. It has been found that it is preferable to use a cored wire electrode when the angle of the joint with respect to the vertical exceeds approximately 15°.

Reference is now made to FIG. 12 which is an electrical diagram of the control circuit for this apparatus. Power from a 110 volt AC source is applied to the control circuit to the power switch PS. Upon closure of the power switch, current is then applied to the pilot light PL and to one contact of the cycle start switch CSS through the normally closed contacts of the cycle stop switch CS. In the embodiment shown herein, the current passes through a normally closed overload switch in each of the power supplies 30 used to supply current to the wire electrodes and then to the coils of relays 1CR and 3CR which energize provided neither of the power sources is overloaded.

Contact 1CR–2 provides a holding circuit across switch CSS thus allowing the operator to release that switch without discontinuing the operation of the device. Current is also supplied through contact 1CR–1 to the "auto" terminal of the oscillator selector switch OSS which, in normal operation, is placed in the "automatic" position. Current is therefore supplied through this switch to the oscillator speed autotransformer OS.

Referring again to contact 1CR–1, current is supplied through this contact, through the generator control auxiliary contacts GCAC–1 and GCAC–2, to relay 2CR. Contacts GCAC–1 and GCAC–2 are microswitches within the generator 30 which close one second after the arc between the electrode and the part or dam 100 is extinguished. Thus, oscillation of the electrodes does not normally begin until after the flux becomes molten. Normally closed contacts 2CR–1 and 2CR–2 then open removing a short circuit across the armature of the feed motor FMA.

Assuming that the wire feed switch WFS is in the forward position, as shown in FIG. 12, current is supplied from the center tap of the wire feed control autotransformer WFC through the now closed contacts 2CR–3 of relay 2CR to a rectifier circuit MAR which supplies a DC voltage to the armature of the feed motor 65. The field winding FMF of this motor is supplied with a constant voltage from rectifier MFR. During that period when relay 2CR is open, current will therefore be removed from the armature and a short circuit placed across the armature to prevent the motor from turning. However, the field winding may continue to be energized. Switch 1B is provided to allow the operator to energize relay 2CR independently, and thus move the electrode into the weld to position it so that an arc can be struck.

The welding voltage is determined by the position of the center tap of the voltage control autotransformer VC which supplies current to rectifier bridge RVR. The DC output from this rectifier bridge is supplied to the control voltage lines which are connected to the power supply through cable 37. Voltage control in this manner is conventional, and in this embodiment, this voltage controls the current through the control winding of a saturable core reactor to control the welding voltage.

The field winding of the oscillator motor 70 receives current from the motor field rectifier MFR while the armature of the oscillator motor is supplied current from rectifie OAR which is in turn connected to the center tap of the oscillator speed autotransformer OS. Thus, speed of the motor 70 is determined by the setting of this autotransformer while the direction of rotation is controlled by the circuit now to be described.

Line voltage is supplied to the primary winding of transformer TR which in turn has its secondary connected to one terminal of the latching relay coil LR. The other terminal passes through the contacts of the limit switches LS1 and LS2 to the other side of the secondary winding. Limit switch LS1 is a normally closed switch, while limit switch LS2 is normally open. As shown, the relay LR will be deenergized and thus the normally open contacts LR1 and LR2 will remain open. For purposes of explanation, assume that the forward movement of the consumable guides is to the right. When the guides reach their right limit position, as determined by the setting of the adjustable stop 76, limit switch LS2 will close momentarily, energizing relay LR, and closing its normally opened contacts LR1 and LR2. Holding current will then be supplied through the normally closed contacts LS1 and now closed contacts LR1 to hold the latching relay energized. This will cause the oscillator motor to reverse and move the consumable guides in the opposite direction. When they reach their left limit position, as determined by the setting of adjustable stop 75, they will momentarily actuate limit switch LS1, opening its normally closed contacts to remove holding current to the relay LR. Thus, the relay LR is either energized, indicating that the motor is moving the consumable guides to the left, or deenergized when the motor is moving the guides toward the right.

Current is supplied to the oscillator motor armature OMA from the oscillator armature rectifier OAR through the normally closed contacts ORR-1 and ORR-2 of the oscillator reversing relay ORR. Current is also supplied through the normally closed contacts of the oscillator dwell relays ODR-1 and ODR-2. At the time the latching relay LR closes, the oscillator reversing relay ORR will energize and a reverse flow of current will be caused to flow through the oscillator motor armature thus reversing its direction of rotation.

This invention provides for a dwell of a predetermined time period at each end of the stroke. This is provided by the oscillator dwell relay ODR which has contacts in series with the oscillator motor armature. As long as this relay is deenergized, the armature receives current from the oscillator armature rectifier, however, when the oscillator dwell relay is energized, current will be interrupted to the oscillator motor armature and in addition the normally open contacts ODR-1 and ODR-2 will close to provide a short circuit across the armature to cause a braking action to exist.

The dwell time is determined by the value of capacitors C1 and C2 and the oscillator dwell time potentiometer ODT. Thus, each time a limit switch is actuated, the oscillator dwell relay ODR will be energized momentarily for a time period which is determined by the setting of potentiometer ODT. As mentioned above, whenever this relay is energized, current is interrupted to the oscillator motor armature and the armature is locked in place until the dwell relay releases. The dwell time allows additional heat to be generated adjacent the water cooled shoes 16.

In the preferred embodiment, the dwell time is a fixed value, nominally two seconds, while the oscillator speed may be adjusted by the operator by a control available on the front panel of the control box 35, in the range from zero to four inches per second.

Momentarily pressing the cycle stop switch CS will open the circuit to release 1CR and 3CR and terminate the operation of the circuit shown in FIG. 12.

Thus, a novel method and apparatus for electroslag welding has been described wherein at least one consumable guide is moved across the thickness of a weld at a controlled rate, and the dwell time of the consumable guides at each end of their stroke is controlled to allow optimum heat distribution.

While the method herein described, and the forms of apparatus for carrying this method into effect, constitute preferred embodiments of the invention, it is to be understood that the invention is not limited to this precise method and apparatus, and that changes may be made in either without departing from the scope of the invention which is defined in the appended claims.

What is claimed is:
1. Apparatus for electroslag welding a plurality of spaced apart parts comprising
   a frame adapted to be mounted on one of the parts;
   means mounted on said frame for supporting at least one consumable guide so that it may extend into a space formed between the parts, said supporting means including a pair of shafts and means for slidably supporting at least one consumable guide on said shafts;
   means for feeding a wire electrode through said consumable guide at a controlled rate into said space;
   power supply means connected to said parts and to said consumable guide so that electric current will flow through said consumable guide and also that portion of the electrode wire extending from said guide into the weld and through said parts to cause melting thereof, said power supply voltage and rate at which said wire electrode is fed into said weld is correlated to maintain sufficient heat in said weld to melt said wire electrode, said consumable guide, and that portion of the parts in the vicinity of the weld, and to insure that no arc exists as the weld progresses;
   means for introducing flux and slag forming materials to said space between the parts to aid in retaining the heat developed in melting said wire electrode and to provide a path for current to flow from said wire electrode to said parts, said slag forming material retaining the heat in the weld so that the heat is evenly distributed across the weld and penetrates and causes melting of that portion of the parts in the immediate vicinity of the weld;
   drive means for repeatedly moving said consumable guide across the thickness of the parts at a predetermined velocity to distribute the heat generated in melting said wire electrode evenly across the weld;
   switch means mounted on said frame;
   adjustable stop means movable with said consumable guide to actuate said switch means when said consumable guide reaches the limits of its travel across the thickness of the parts; and
   means for controlling the speed of said drive means and the length of time said consumable guide dwells at its limit positions.
2. The apparatus as defined in claim 1 wherein said drive means includes
   a motor;
   a rack mounted to said consumable guide; and
   a pinion gear on said motor which cooperates with said rack to drive the consumable guide across the parts.

References Cited

UNITED STATES PATENTS

| | | | |
|---|---|---|---|
| 3,180,970 | 4/1965 | Gilson et al. | 219—137 |
| 3,192,356 | 6/1965 | Shrubsall | 219—73 |
| 3,291,955 | 12/1966 | Shrubsall et al. | |
| 2,645,703 | 7/1953 | Dahl | 219—125 |
| 3,002,081 | 9/1961 | Wenzel | 219—76 |
| 3,125,700 | 3/1964 | Bentley et al. | 219—125 |
| 3,200,232 | 8/1965 | Danhier | 219—126 |
| 3,211,887 | 10/1965 | Cotterman | 219—73 |
| 3,247,357 | 4/1966 | Koch | 219—126 |
| 3,296,412 | 1/1967 | Waite et al. | 219—73 |
| 3,325,619 | 6/1967 | Tanenbaum | 219—73 |
| 3,337,712 | 8/1967 | Lucey | 219—73 |
| 3,419,700 | 12/1968 | Tanigaki et al. | 219—126 |
| 3,431,385 | 3/1969 | Santilhano | 219—126 |

JOSEPH V. TRUHE, Primary Examiner

U.S. Cl. X.R.

219—126, 137